(12) United States Patent
Kiser et al.

(10) Patent No.: US 12,309,427 B2
(45) Date of Patent: May 20, 2025

(54) IMAGE COMPRESSION

(71) Applicant: Contrast, Inc., Albuquerque, NM (US)

(72) Inventors: Willie C. Kiser, Albuquerque, NM (US); Michael D. Tocci, Albuquerque, NM (US); Nora Tocci, Albuquerque, NM (US)

(73) Assignee: Contrast, Inc., Albuquerque, NM (US)

( * ) Notice: Subject to any disclaimer, the term of this patent is extended or adjusted under 35 U.S.C. 154(b) by 18 days.

(21) Appl. No.: 17/717,727

(22) Filed: Apr. 11, 2022

(65) Prior Publication Data

US 2022/0272384 A1 Aug. 25, 2022

Related U.S. Application Data

(63) Continuation of application No. 16/539,601, filed on Aug. 13, 2019, now Pat. No. 11,303,932.

(60) Provisional application No. 62/718,610, filed on Aug. 14, 2018.

(51) Int. Cl.
| | | |
|---|---|---|
| H04N 19/62 | (2014.01) | |
| H04N 1/60 | (2006.01) | |
| H04N 9/77 | (2006.01) | |
| H04N 19/11 | (2014.01) | |
| H04N 19/117 | (2014.01) | |
| H04N 19/176 | (2014.01) | |
| H04N 19/625 | (2014.01) | |

(52) U.S. Cl.
CPC ......... *H04N 19/625* (2014.11); *H04N 1/6008* (2013.01); *H04N 9/77* (2013.01); *H04N 19/117* (2014.11); *H04N 19/176* (2014.11); *H04N 19/62* (2014.11)

(58) Field of Classification Search
CPC ... H04N 19/625; H04N 1/6008; H04N 19/117
USPC ...................................................... 375/240.2
See application file for complete search history.

(56) References Cited

U.S. PATENT DOCUMENTS

| | | | |
|---|---|---|---|
| 2,560,351 | A | 7/1951 | Kell |
| 2,642,487 | A | 6/1953 | Schroeder |
| 2,971,051 | A | 2/1961 | Back |
| 3,202,039 | A | 8/1965 | DeLang |
| 3,381,084 | A | 4/1968 | Wheeler |

(Continued)

FOREIGN PATENT DOCUMENTS

| | | |
|---|---|---|
| CN | 101344706 B | 9/2010 |
| CN | 105472265 A | 4/2016 |

(Continued)

OTHER PUBLICATIONS

Tocci, 2011, A versatile HDR video production system, ACM Transactions on Graphics (TOG)—Proceedings of ACM SIGGRAPH 2011, 30(4):article 41 (9 pages).

(Continued)

*Primary Examiner* — Jeffery A Williams
(74) *Attorney, Agent, or Firm* — Thomas C. Meyers; Sullivan & Worcester LLP (57) ABSTRACT

The invention provides methods that improve image compression and/or quality within the JPEG process by using a low-pass filter to remove high frequency components from image data, which removes blocking artifacts. Preferred embodiments apply the low-pass filter to the Chroma components after decompression prior to conversion into RGB color space.

12 Claims, 8 Drawing Sheets

(56) References Cited

U.S. PATENT DOCUMENTS

| | | | |
|---|---|---|---|
| 3,474,451 A | 10/1969 | Abel | |
| 3,601,480 A | 8/1971 | Randall | |
| 3,653,748 A | 4/1972 | Athey | |
| 3,659,918 A | 5/1972 | Tan | |
| 3,668,304 A | 6/1972 | Eilenberger | |
| 3,720,146 A | 3/1973 | Yost, Jr. | |
| 3,802,763 A | 4/1974 | Cook et al. | |
| 3,945,034 A | 3/1976 | Suzuki | |
| 4,009,941 A | 3/1977 | Verdijk et al. | |
| 4,072,405 A | 2/1978 | Ozeki | |
| 4,084,180 A | 4/1978 | Stoffels et al. | |
| 4,134,683 A | 1/1979 | Goetz et al. | |
| 4,268,119 A | 5/1981 | Hartmann | |
| 4,395,234 A | 7/1983 | Shenker | |
| 4,396,188 A | 8/1983 | Dreissigacker et al. | |
| 4,486,069 A | 12/1984 | Neil et al. | |
| 4,555,163 A | 11/1985 | Wagner | |
| 4,584,606 A | 4/1986 | Nagasaki | |
| 4,743,011 A | 5/1988 | Coffey | |
| 4,786,813 A | 11/1988 | Svanberg et al. | |
| 4,805,037 A | 2/1989 | Noble et al. | |
| 4,916,529 A | 4/1990 | Yamamoto et al. | |
| 4,933,751 A | 6/1990 | Shinonaga et al. | |
| 5,024,530 A | 6/1991 | Mende | |
| 5,092,581 A | 3/1992 | Koz | |
| 5,093,563 A | 3/1992 | Small et al. | |
| 5,134,468 A | 7/1992 | Ohmuro | |
| 5,153,621 A | 10/1992 | Vogeley | |
| 5,155,623 A | 10/1992 | Miller et al. | |
| 5,194,959 A | 3/1993 | Kaneko et al. | |
| 5,272,518 A | 12/1993 | Vincent | |
| 5,275,518 A | 1/1994 | Guenther | |
| 5,333,212 A * | 7/1994 | Ligtenberg | H04N 19/80 |
| | | | 375/E7.193 |
| 5,355,165 A | 10/1994 | Kosonocky et al. | |
| 5,386,316 A | 1/1995 | Cook | |
| 5,642,191 A | 6/1997 | Mende | |
| 5,644,432 A | 7/1997 | Doany | |
| 5,707,322 A | 1/1998 | Dreissigacker et al. | |
| 5,729,011 A | 3/1998 | Sekiguchi | |
| 5,734,507 A | 3/1998 | Harvey | |
| 5,801,773 A | 9/1998 | Ikeda | |
| 5,835,278 A | 11/1998 | Rubin et al. | |
| 5,856,466 A | 1/1999 | Cook et al. | |
| 5,881,043 A | 3/1999 | Hasegawa et al. | |
| 5,881,180 A | 3/1999 | Chang et al. | |
| 5,900,942 A | 5/1999 | Spiering | |
| 5,905,490 A | 5/1999 | Shu et al. | |
| 5,926,283 A | 7/1999 | Hopkins | |
| 5,929,908 A | 7/1999 | Takahashi et al. | |
| 6,011,876 A | 1/2000 | Kishner | |
| 6,215,597 B1 | 4/2001 | Duncan et al. | |
| 6,392,687 B1 | 5/2002 | Driscoll, Jr. et al. | |
| 6,429,016 B1 | 8/2002 | McNeil | |
| 6,614,478 B1 | 9/2003 | Mead | |
| 6,633,683 B1 | 10/2003 | Dinh et al. | |
| 6,646,716 B1 | 11/2003 | Ramanujan et al. | |
| 6,674,487 B1 | 1/2004 | Smith | |
| 6,747,694 B1 | 6/2004 | Nishikawa et al. | |
| 6,801,719 B1 | 10/2004 | Szajewski et al. | |
| 6,856,466 B2 | 2/2005 | Tocci | |
| 6,937,770 B1 | 8/2005 | Oguz et al. | |
| 7,068,890 B2 | 6/2006 | Soskind et al. | |
| 7,084,905 B1 | 8/2006 | Nayar et al. | |
| 7,138,619 B1 | 11/2006 | Ferrante et al. | |
| 7,177,085 B2 | 2/2007 | Tocci et al. | |
| 7,283,307 B2 | 10/2007 | Couture et al. | |
| 7,336,299 B2 | 2/2008 | Kostrzewski et al. | |
| 7,397,509 B2 | 7/2008 | Krymski | |
| 7,405,882 B2 | 7/2008 | Uchiyama et al. | |
| 7,535,647 B1 | 5/2009 | Otten, III et al. | |
| 7,623,781 B1 | 11/2009 | Sassa | |
| 7,714,998 B2 | 5/2010 | Furman et al. | |
| 7,719,674 B2 | 5/2010 | Furman et al. | |
| 7,731,637 B2 | 6/2010 | D'Eredita | |
| 7,961,398 B2 | 6/2011 | Tocci | |
| 8,035,711 B2 | 10/2011 | Liu et al. | |
| 8,320,047 B2 | 11/2012 | Tocci | |
| 8,323,047 B2 | 12/2012 | Reusche et al. | |
| 8,340,442 B1 | 12/2012 | Rasche | |
| 8,441,732 B2 | 5/2013 | Tocci | |
| 8,606,009 B2 | 12/2013 | Sun | |
| 8,610,789 B1 | 12/2013 | Nayar et al. | |
| 8,619,368 B2 | 12/2013 | Tocci | |
| 8,622,876 B2 | 1/2014 | Kelliher | |
| 8,659,683 B1 | 2/2014 | Linzer | |
| 8,843,938 B2 | 9/2014 | MacFarlane et al. | |
| 8,982,962 B2 | 3/2015 | Alshin et al. | |
| 9,087,229 B2 | 7/2015 | Nguyen et al. | |
| 9,129,445 B2 | 9/2015 | Mai et al. | |
| 9,131,150 B1 | 9/2015 | Mangiat et al. | |
| 9,258,468 B2 | 2/2016 | Cotton et al. | |
| 9,264,659 B2 | 2/2016 | Abuan et al. | |
| 9,277,122 B1 | 3/2016 | Imura et al. | |
| 9,459,692 B1 | 10/2016 | Li | |
| 9,488,984 B1 | 11/2016 | Williams et al. | |
| 9,560,339 B2 | 1/2017 | Borowski | |
| 9,633,417 B2 | 4/2017 | Sugimoto et al. | |
| 9,654,738 B1 | 5/2017 | Ferguson et al. | |
| 9,661,245 B2 | 5/2017 | Kawano | |
| 9,675,236 B2 | 6/2017 | McDowall | |
| 9,677,840 B2 | 6/2017 | Rublowsky et al. | |
| 9,720,231 B2 | 8/2017 | Erinjippurath et al. | |
| 9,779,490 B2 | 10/2017 | Bishop | |
| 9,800,856 B2 | 10/2017 | Venkataraman et al. | |
| 9,904,981 B2 | 2/2018 | Jung et al. | |
| 9,948,829 B2 | 4/2018 | Kiser et al. | |
| 9,955,084 B1 | 4/2018 | Haynold | |
| 9,974,996 B2 | 5/2018 | Kiser | |
| 9,998,692 B1 | 6/2018 | Griffiths | |
| 10,038,855 B2 | 7/2018 | Cote et al. | |
| 10,165,182 B1 | 12/2018 | Chen | |
| 10,200,569 B2 | 2/2019 | Kiser et al. | |
| 10,257,393 B2 | 4/2019 | Kiser et al. | |
| 10,257,394 B2 | 4/2019 | Kiser et al. | |
| 10,264,196 B2 | 4/2019 | Kiser et al. | |
| 10,536,612 B2 | 1/2020 | Kiser et al. | |
| 10,554,901 B2 | 2/2020 | Kiser et al. | |
| 10,601,908 B1 | 3/2020 | Ragupathy et al. | |
| 10,616,512 B2 | 4/2020 | Ingle et al. | |
| 10,679,320 B1 | 6/2020 | Kunz | |
| 10,742,847 B2 | 8/2020 | Kiser et al. | |
| 10,805,505 B2 | 10/2020 | Kiser et al. | |
| 10,819,925 B2 | 10/2020 | Kiser et al. | |
| 10,951,888 B2 | 3/2021 | Kiser et al. | |
| 11,303,932 B2 * | 4/2022 | Kiser | H04N 19/625 |
| 2002/0014577 A1 | 2/2002 | Ulrich et al. | |
| 2002/0089765 A1 | 7/2002 | Nalwa | |
| 2002/0164084 A1 * | 11/2002 | Baggs | G06T 5/70 |
| | | | 382/268 |
| 2003/0007254 A1 | 1/2003 | Tocci | |
| 2003/0016334 A1 | 1/2003 | Weber et al. | |
| 2003/0048493 A1 | 3/2003 | Pontifex et al. | |
| 2003/0072011 A1 | 4/2003 | Shirley | |
| 2003/0081674 A1 | 5/2003 | Malvar | |
| 2003/0122930 A1 | 7/2003 | Schofield et al. | |
| 2003/0138154 A1 | 7/2003 | Suino | |
| 2004/0119020 A1 | 6/2004 | Bodkin | |
| 2004/0125228 A1 | 7/2004 | Dougherty | |
| 2004/0143380 A1 | 7/2004 | Stam et al. | |
| 2004/0156134 A1 | 8/2004 | Furuki et al. | |
| 2004/0179834 A1 | 9/2004 | Szajewski et al. | |
| 2004/0202376 A1 | 10/2004 | Schwartz et al. | |
| 2004/0228406 A1 | 11/2004 | Song | |
| 2005/0001983 A1 | 1/2005 | Weber et al. | |
| 2005/0041113 A1 | 2/2005 | Nayar et al. | |
| 2005/0099504 A1 | 5/2005 | Nayar et al. | |
| 2005/0117799 A1 | 6/2005 | Fuh et al. | |
| 2005/0151860 A1 | 7/2005 | Silverstein et al. | |
| 2005/0157943 A1 | 7/2005 | Ruggiero | |
| 2005/0168578 A1 | 8/2005 | Gobush | |
| 2005/0198482 A1 | 9/2005 | Cheung et al. | |
| 2005/0212827 A1 | 9/2005 | Goertzen | |
| 2005/0219659 A1 | 10/2005 | Quan | |

(56) References Cited

U.S. PATENT DOCUMENTS

| | | |
|---|---|---|
| 2006/0001761 A1 | 1/2006 | Haba et al. |
| 2006/0002611 A1 | 1/2006 | Mantiuk et al. |
| 2006/0061680 A1 | 3/2006 | Madhavan et al. |
| 2006/0104508 A1 | 5/2006 | Daly et al. |
| 2006/0184040 A1 | 8/2006 | Keller et al. |
| 2006/0209204 A1 | 9/2006 | Ward |
| 2006/0215882 A1 | 9/2006 | Ando et al. |
| 2006/0221209 A1 | 10/2006 | McGuire et al. |
| 2006/0249652 A1 | 11/2006 | Schleifer |
| 2006/0262275 A1 | 11/2006 | Domroese et al. |
| 2006/0291729 A1* | 12/2006 | Wu ............... H04N 19/61 375/E7.187 |
| 2007/0025717 A1 | 2/2007 | Raskar et al. |
| 2007/0073484 A1 | 3/2007 | Horibe |
| 2007/0086087 A1 | 4/2007 | Dent et al. |
| 2007/0133889 A1 | 6/2007 | Horie et al. |
| 2007/0152804 A1 | 7/2007 | Breed et al. |
| 2007/0182844 A1 | 8/2007 | Allman et al. |
| 2007/0189750 A1 | 8/2007 | Wong et al. |
| 2007/0189758 A1 | 8/2007 | Iwasaki |
| 2007/0201560 A1 | 8/2007 | Segall et al. |
| 2007/0258641 A1 | 11/2007 | Srinivasan et al. |
| 2008/0013051 A1 | 1/2008 | Glinski et al. |
| 2008/0030611 A1 | 2/2008 | Jenkins |
| 2008/0037883 A1 | 2/2008 | Tsutsumi et al. |
| 2008/0055683 A1 | 3/2008 | Choe et al. |
| 2008/0068721 A1 | 3/2008 | Murnan et al. |
| 2008/0094486 A1 | 4/2008 | Fuh et al. |
| 2008/0100910 A1 | 5/2008 | Kim et al. |
| 2008/0112651 A1 | 5/2008 | Cho et al. |
| 2008/0175496 A1 | 7/2008 | Segall |
| 2008/0198235 A1 | 8/2008 | Chen et al. |
| 2008/0198266 A1 | 8/2008 | Kurane |
| 2008/0239155 A1 | 10/2008 | Wong et al. |
| 2008/0297460 A1 | 12/2008 | Peng et al. |
| 2008/0304562 A1 | 12/2008 | Chang |
| 2009/0015683 A1 | 1/2009 | Ando |
| 2009/0059048 A1 | 3/2009 | Luo et al. |
| 2009/0161019 A1 | 6/2009 | Jang |
| 2009/0213225 A1 | 8/2009 | Jin et al. |
| 2009/0225433 A1 | 9/2009 | Tocci |
| 2009/0244717 A1 | 10/2009 | Tocci |
| 2009/0290043 A1 | 11/2009 | Liu et al. |
| 2010/0013963 A1 | 1/2010 | Jannard |
| 2010/0098333 A1 | 4/2010 | Aoyagi |
| 2010/0100268 A1 | 4/2010 | Zhang et al. |
| 2010/0149546 A1 | 6/2010 | Kobayashi et al. |
| 2010/0172409 A1 | 7/2010 | Reznik et al. |
| 2010/0201799 A1 | 8/2010 | Mohrholz et al. |
| 2010/0225783 A1 | 9/2010 | Wagner |
| 2010/0266008 A1 | 10/2010 | Reznik |
| 2010/0271512 A1 | 10/2010 | Garten |
| 2010/0328780 A1 | 12/2010 | Tocci |
| 2011/0028278 A1 | 2/2011 | Roach |
| 2011/0058050 A1 | 3/2011 | Lasang et al. |
| 2011/0188744 A1 | 8/2011 | Sun |
| 2011/0194618 A1 | 8/2011 | Gish et al. |
| 2011/0221793 A1 | 9/2011 | King, III et al. |
| 2012/0025080 A1 | 2/2012 | Liu et al. |
| 2012/0134551 A1 | 5/2012 | Wallace |
| 2012/0147953 A1 | 6/2012 | El-Mahdy et al. |
| 2012/0154370 A1 | 6/2012 | Russell et al. |
| 2012/0179833 A1 | 7/2012 | Kenrick et al. |
| 2012/0193520 A1 | 8/2012 | Bewersdorf et al. |
| 2012/0212964 A1 | 8/2012 | Chang et al. |
| 2012/0241867 A1 | 9/2012 | Ono et al. |
| 2012/0242867 A1 | 9/2012 | Shuster |
| 2012/0260174 A1 | 10/2012 | Imaida et al. |
| 2012/0299940 A1 | 11/2012 | Dietrich, Jr. et al. |
| 2012/0307893 A1 | 12/2012 | Reznik et al. |
| 2013/0021447 A1 | 1/2013 | Brisedoux et al. |
| 2013/0021505 A1 | 1/2013 | Plowman et al. |
| 2013/0027565 A1 | 1/2013 | Solhusvik et al. |
| 2013/0038689 A1 | 2/2013 | McDowall |
| 2013/0057971 A1 | 3/2013 | Zhao et al. |
| 2013/0063300 A1 | 3/2013 | O'Regan et al. |
| 2013/0064448 A1 | 3/2013 | Tomaselli et al. |
| 2013/0083855 A1 | 4/2013 | Kottke |
| 2013/0093805 A1 | 4/2013 | Iversen |
| 2013/0094705 A1 | 4/2013 | Tyagi et al. |
| 2013/0128957 A1 | 5/2013 | Bankoski et al. |
| 2013/0148139 A1 | 6/2013 | Matsuhira |
| 2013/0190965 A1 | 7/2013 | Einecke et al. |
| 2013/0194675 A1 | 8/2013 | Tocci |
| 2013/0215290 A1 | 8/2013 | Solhusvik et al. |
| 2013/0250113 A1 | 9/2013 | Bechtel et al. |
| 2013/0286451 A1 | 10/2013 | Verhaegh |
| 2013/0329053 A1 | 12/2013 | Jones et al. |
| 2013/0329087 A1 | 12/2013 | Tico et al. |
| 2014/0002694 A1 | 1/2014 | Levy et al. |
| 2014/0063300 A1 | 3/2014 | Lin et al. |
| 2014/0085422 A1 | 3/2014 | Aronsson et al. |
| 2014/0104051 A1 | 4/2014 | Breed |
| 2014/0132946 A1 | 5/2014 | Sebastian et al. |
| 2014/0152694 A1 | 6/2014 | Narasimha et al. |
| 2014/0168486 A1 | 6/2014 | Geiss |
| 2014/0184894 A1 | 7/2014 | Motta |
| 2014/0192214 A1 | 7/2014 | Laroia |
| 2014/0198187 A1 | 7/2014 | Lukk |
| 2014/0204195 A1 | 7/2014 | Katashiba et al. |
| 2014/0210847 A1 | 7/2014 | Knibbeler et al. |
| 2014/0263950 A1 | 9/2014 | Fenigstein et al. |
| 2014/0297671 A1 | 10/2014 | Richard |
| 2014/0313369 A1 | 10/2014 | Kageyama et al. |
| 2014/0321766 A1 | 10/2014 | Jo |
| 2015/0077281 A1 | 3/2015 | Taniguchi et al. |
| 2015/0078661 A1 | 3/2015 | Granados et al. |
| 2015/0138339 A1 | 5/2015 | Einecke et al. |
| 2015/0151725 A1 | 6/2015 | Clarke et al. |
| 2015/0172608 A1 | 6/2015 | Routhier et al. |
| 2015/0175161 A1 | 6/2015 | Breed |
| 2015/0201222 A1 | 7/2015 | Mertens |
| 2015/0208024 A1 | 7/2015 | Takahashi et al. |
| 2015/0215595 A1 | 7/2015 | Yoshida |
| 2015/0245043 A1 | 8/2015 | Greenebaum et al. |
| 2015/0245044 A1 | 8/2015 | Guo et al. |
| 2015/0256843 A1* | 9/2015 | Roskowski ............ H04N 19/91 382/246 |
| 2015/0296140 A1 | 10/2015 | Kim |
| 2015/0302562 A1 | 10/2015 | Zhai et al. |
| 2015/0312498 A1 | 10/2015 | Kawano |
| 2015/0312536 A1 | 10/2015 | Butler et al. |
| 2016/0007052 A1 | 1/2016 | Haitsuka et al. |
| 2016/0007910 A1 | 1/2016 | Boss et al. |
| 2016/0026253 A1 | 1/2016 | Bradski et al. |
| 2016/0050354 A1 | 2/2016 | Musatenko et al. |
| 2016/0057333 A1 | 2/2016 | Liu et al. |
| 2016/0093029 A1 | 3/2016 | Micovic et al. |
| 2016/0163356 A1 | 6/2016 | De Haan et al. |
| 2016/0164120 A1 | 6/2016 | Swiegers et al. |
| 2016/0165120 A1 | 6/2016 | Lim |
| 2016/0173811 A1 | 6/2016 | Oh et al. |
| 2016/0191795 A1 | 6/2016 | Han et al. |
| 2016/0195877 A1 | 7/2016 | Franzius et al. |
| 2016/0205341 A1 | 7/2016 | Hollander et al. |
| 2016/0205368 A1 | 7/2016 | Wallace et al. |
| 2016/0227193 A1 | 8/2016 | Osterwood et al. |
| 2016/0239276 A1 | 8/2016 | Maclean et al. |
| 2016/0252727 A1 | 9/2016 | Mack et al. |
| 2016/0301959 A1 | 10/2016 | Oh et al. |
| 2016/0307602 A1 | 10/2016 | Mertens |
| 2016/0323518 A1 | 11/2016 | Rivard et al. |
| 2016/0344977 A1 | 11/2016 | Murao |
| 2016/0345032 A1 | 11/2016 | Tsukagoshi |
| 2016/0353123 A1 | 12/2016 | Ninan |
| 2016/0360212 A1 | 12/2016 | Dai et al. |
| 2016/0360213 A1 | 12/2016 | Lee et al. |
| 2016/0375297 A1 | 12/2016 | Kiser |
| 2017/0006273 A1 | 1/2017 | Borer et al. |
| 2017/0026594 A1 | 1/2017 | Shida et al. |
| 2017/0039716 A1 | 2/2017 | Morris et al. |
| 2017/0070719 A1 | 3/2017 | Smolic et al. |
| 2017/0084006 A1 | 3/2017 | Stewart |
| 2017/0111643 A1 | 4/2017 | Bugdayci Sansli et al. |

(56) References Cited

U.S. PATENT DOCUMENTS

| | | | |
|---|---|---|---|
| 2017/0126987 A1 | 5/2017 | Tan et al. |
| 2017/0155818 A1 | 6/2017 | Bonnet |
| 2017/0155873 A1 | 6/2017 | Nguyen |
| 2017/0186141 A1 | 6/2017 | Ha et al. |
| 2017/0237879 A1 | 8/2017 | Kiser et al. |
| 2017/0237890 A1 | 8/2017 | Kiser et al. |
| 2017/0237913 A1 | 8/2017 | Kiser et al. |
| 2017/0238029 A1 | 8/2017 | Tocci |
| 2017/0270702 A1 | 9/2017 | Gauthier et al. |
| 2017/0279530 A1 | 9/2017 | Tsukagoshi |
| 2017/0302858 A1 | 10/2017 | Porter et al. |
| 2017/0352131 A1 | 12/2017 | Berlin et al. |
| 2017/0374390 A1 | 12/2017 | Leleannec et al. |
| 2018/0005356 A1 | 1/2018 | Van Der Vleuten et al. |
| 2018/0048801 A1 | 2/2018 | Kiser et al. |
| 2018/0054566 A1 | 2/2018 | Yaguchi |
| 2018/0063537 A1 | 3/2018 | Sasai et al. |
| 2018/0152721 A1 | 5/2018 | Rusanovskyy et al. |
| 2018/0189170 A1 | 7/2018 | Dwarakanath et al. |
| 2018/0198957 A1 | 7/2018 | Kiser et al. |
| 2019/0014308 A1 | 1/2019 | Kiser et al. |
| 2019/0130630 A1 | 5/2019 | Ackerson et al. |
| 2019/0166283 A1 | 5/2019 | Kiser et al. |
| 2019/0238725 A1 | 8/2019 | Kiser et al. |
| 2019/0238726 A1 | 8/2019 | Kiser et al. |
| 2019/0238766 A1 | 8/2019 | Kiser et al. |
| 2019/0324888 A1 | 10/2019 | Evans et al. |
| 2019/0349581 A1 | 11/2019 | Fuchie et al. |
| 2019/0373260 A1 | 12/2019 | Kiser et al. |
| 2020/0036918 A1 | 1/2020 | Ingle et al. |
| 2020/0058104 A1 | 2/2020 | Kiser et al. |
| 2020/0059670 A1 | 2/2020 | Kiser et al. |
| 2020/0097295 A1 | 3/2020 | Xu et al. |
| 2020/0154030 A1 | 5/2020 | Kiser et al. |
| 2020/0235607 A1 | 7/2020 | Kanarellis et al. |
| 2020/0320955 A1 | 10/2020 | Kiser et al. |
| 2020/0368616 A1 | 11/2020 | Delamont |
| 2021/0029271 A1 | 1/2021 | Kiser et al. |
| 2021/0034342 A1 | 2/2021 | Hoy |
| 2021/0044765 A1 | 2/2021 | Kiser et al. |
| 2021/0099616 A1 | 4/2021 | Kiser et al. |
| 2021/0227220 A1 | 7/2021 | Kiser et al. |

FOREIGN PATENT DOCUMENTS

| | | | | |
|---|---|---|---|---|
| EP | 0484802 | A2 | 5/1992 | |
| EP | 1225574 | A2 | 7/2002 | |
| EP | 1395062 | A1 | 3/2004 | |
| EP | 1511319 | A1 | 3/2005 | |
| EP | 3051821 | A1 | 8/2016 | |
| EP | 3070934 | A1 | 9/2016 | |
| GB | 2526047 | A | 11/2015 | |
| GB | 2539917 | A | 1/2017 | |
| JP | S53093026 | A | 8/1978 | |
| JP | S53124028 | A | 10/1978 | |
| JP | S60213178 | A | 10/1985 | |
| JP | S63160489 | A | 7/1988 | |
| JP | H0468876 | A | 3/1992 | |
| JP | H0564070 | A | 3/1993 | |
| JP | H06335006 | A | 12/1994 | |
| JP | H07107346 | A | 4/1995 | |
| JP | H08220585 | A | 8/1996 | |
| JP | H11127441 | A | 5/1999 | |
| JP | 2000019407 | A | 1/2000 | |
| JP | 2000338313 | A | 12/2000 | |
| JP | 2001136434 | A | 5/2001 | |
| JP | 2002165108 | A | 6/2002 | |
| JP | 2002-369210 | A | 12/2002 | |
| JP | 2003035881 | A | 2/2003 | |
| JP | 2005-117524 | A | 4/2005 | |
| JP | 2007-96510 | A | 4/2007 | |
| JP | 2007-243942 | A | 9/2007 | |
| JP | 2007-281816 | A | 10/2007 | |
| JP | 2007295326 | A | 11/2007 | |
| JP | 2009-17157 | A | 1/2009 | |
| JP | 2013-27021 | A | 2/2013 | |
| JP | 2014-524290 | A | 9/2014 | |
| KR | 100695003 | B1 | 3/2007 | |
| KR | 101310140 | B1 | 9/2013 | |
| WO | 2005025685 | A1 | 3/2005 | |
| WO | 2009/043494 | A1 | 4/2009 | |
| WO | 2009/111642 | A1 | 9/2009 | |
| WO | 2009/121068 | A2 | 10/2009 | |
| WO | 2010080662 | A1 | 7/2010 | |
| WO | WO-2010080662 | A2 * | 7/2010 | ........... G06F 17/147 |
| WO | 2011/032028 | A2 | 3/2011 | |
| WO | 2012/076646 | A1 | 6/2012 | |
| WO | 2013/025530 | A1 | 2/2013 | |
| WO | 2015/072754 | A1 | 5/2015 | |
| WO | 2015/173570 | A1 | 11/2015 | |
| WO | 2017/139363 | A1 | 8/2017 | |
| WO | 2017/139596 | A1 | 8/2017 | |
| WO | 2017/139600 | A1 | 8/2017 | |
| WO | 2017/157845 | A1 | 9/2017 | |

OTHER PUBLICATIONS

Tourapis, 2015, Deblocking in HEVC: some observations from the HDR/WCG CfE, JCTVC-U0043.
Touze, 2014, HDR video coding based on local LDR quantization, Second International Conference and SME Workshop on HDR imaging (6 pages).
Unattributed, 2018, JPEG YCbCr Support, Microsoft, Retrieved from the Internet on Nov. 20, 2019 from <https://docs.microsoft.com/en-us/windows/win32/wic/jpeg-ycbcr-support> (14 pages).
Wei, 2011, Analysis of JPEG encoder for image compression, IEEEICMT 205-208.
Wige, 2010, Analysis of In-Loop Denoising in Lossy Transform Coding, 28th Picture Coding Symposium, pp. 82-85.
Wong, 2017, Ultra-low latency contiguous block-parallel stream windowing using FPGA on-chip memory, FPT 56-63.
Yeadon, 1996, Qos filters: Addressing the heterogeneity gap, Interactive Distributed Multimedia Systems and Services, Springer Berlin Heidelberg, pp. 227-243.
Aggarwal, 2004, Split Aperture Imaging for High Dynamic Range, Int J Comp Vis 58(1):7-17.
Alleysson, 2006, HDR CFA Image Rendering, Proc EURASIP 14th European Signal Processing Conf. (5 pages).
Altera, 2010, Memory System Design, Chapter 7 in Embedded Design Handbook, Altera Corporation (18 pages).
Banterle, 2009, High dynamic range imaging and low dynamic range expansion for generating HDR content, Eurographics State of the The Art Report (18 pages).
Borer, 2014, Non-linear opto-electrical transfer functions for high dynamic range television, Research and Development White Paper, British Broadcasting Corporation (24 pages).
Bravo, 2011, Efficient smart CMOS camera based on FPGAs oriented to embedded image processing, Sensors 11:2282-2303.
Cao, 2003, Dynamic configuration management in a graph-oriented distributed programming environment, Sci Comp Prog 48:43-65.
Cao, 2005, GOP: A graph-oriented programming model for parallel and distributed systems, Chapter 2 in New Horizons of Parallel and Distributed Computing, Guo & Yang, Eds., Springer (Boston, MA) (17 pages).
Chan, 2005, Visual programming support for graph-oriented parallel/ distributed processing, Softw Pract Exper 35:1409-1439.
Damazio, 2006, A codec architecture for real-time High Dynamic Range video, VIII Symposium on Virtual and Augmented Reality (Belém, PA, Brazil) (9 pages).
Debevec, 1997, Recovering High Dynamic Range Radiance Maps from Photographs, Int Conf Comp Graphics and Interactive Techniques, proceedings (10 pages).
Dhanani, 2008, HD video line buffering in FPGA, EE Times (5 pages).
Flux Data Inc, 2008, FD-1665 High Resolution 3 CCD Multispectral Industrial Camera, web.archive.orgweb20080113023949www.fluxdata.com/prod (7 pages).
Geronimo, 2010, Survey of pedestrian detection for advanced driver assistance systems, IEEE Trans Pat Anal Mach Int 32(7):1239-58.

(56) References Cited

OTHER PUBLICATIONS

Gurel, 2016, A comparative study between RTL and HLS for image processing applications with FPGAs, Thesis, UC San Diego (78 pages).
Hegarty, 2014, Darkroom: compiling high-level image processing code into hardware pipelines, ACM Trans Graph 33(4):144.
Jack, 2005, Color spaces, Chapter 3 in Video Demystified: A Handbook for the Digital Engineer, 4Ed, Newnes (20 pages).
Kao, 2008, High Dynamic Range Imaging by Fusing Multiple Raw Images and Tone Reproduction, IEEE Transactions on Consumer Electronics 54(1):10-15.
Kresch, 1999, Fast DCT domain filtering using the DCT and the DST, IEEE Trans Imag Proc (29 pages).
Lawal, 2007, C++ based system synthesis of real-time video processing systems targeting FPGA implementation, IEEE Int Par Dist Proc Symposium, Rome, pp. 1-7.
Lawal, 2008, Memory synthesis for FPGA implementations of real-time video processing systems, Thesis, Mid Sweden U (102 pages).
Lukac, 2004, Demosaicked Image Postprocessing Using Local Color Ratios, IEEE Transactions on Circuits and Systems for Video Technology 14(6):914-920.
Lyu, 2014, A 12-bit high-speed col. parallel two-step single-slope analog-to-digital converter (ADC) for CMOS image sensors, Sensors 14:21603-21625.
Machine translation of CN 101344706 B, generated on May 19, 2017, by espacenet (11 pages).
Machine translation of JP 2000019407 A generated on May 30, 2017, by EPO website (52 pages).
Machine translation of JP 2000338313 A generated on Dec. 21, 2016, by Espacenet (9 pages).
Machine translation of JP 2001136434 A generated on Dec. 21, 2016, by Espacent (25 pages).
Machine translation of JP 2002165108 A generated on Dec. 21, 2016, by Espacenet (27 pages).
Machine translation of JP 2003035881 A genertaed on May 30, 2017, by EPO website (19 pages).
Machine translation of JP 2007295326 A generated on Dec. 21, 2016, by the European Patent Office website Espace.net (12 pages).
Machine translation of JP 2007295326 A generated on Dec. 21, 2016, by the European Patent Office website Espacent (12 pages).
Machine translation of JP H04068876 A generated on Dec. 21, 2016, by Espacent (8 pages).
Machine translation of JP H0564070 A generated on Dec. 21, 2016, by Espacenet (19 pages).
Machine translation of JP H06335006 A generated on Dec. 21, 2016, by Espacenet (9 pages).
Machine translation of JP H07107346 generated on Dec. 21, 2016, by Espacent (21 pages).
Machine translation of JP H08 220585 A obtained Feb. 3, 2020, from Espacenet (14 pages).
Machine translation of JP S53093026 A, issued as JP S599888, generated on Dec. 21, 2016 (5 pages).
Machine translation of JP S60213178 A generated on May 30, 2017, by EPO website (6 pages).
Machine translation of JPH08220585 generated by European Patent Office on Oct. 15, 2019 (11 pages).
Myszkowki, 2008, High Dynamic Range Video, Morgan & Claypool Publishers, San Rafael, CA (158 pages).
Nayar, 2000, High dynamic range imaging: spatially varying pixel exposures, 2000 Proc IEEE Conf on Comp Vision and Pattern Rec, ISSN: 1063-6919 (8 pages).
Nosratinia, 2002, Enhancement of JPEG-compressed images by re-application of JPEG, Journal of VLSI signal processing systems for signal, image and video technology (20 pages).
Oliveira, 2012, Functional programming with structured graphs, ICFP'12 (12 pages).
Rahman, 2011, Pipeline synthesis and optimization of FPGA-based video processing applications with CAL, EURASIP J Image Vid Processing 19:1-28.
Roberts, 2017, Lossy Data Compression: JPEG, Stanford faculty page (5 pages) Retrieved from the Internet on Feb. 3, 2017, from <https://cs.stanford.edu/people/eroberts/courses/soco/projects/data-compression/lossy/jpeg/dct.htm>( 5 pages).
Schulte, 2016, HDR Demystified: Emerging UHDTV systems, SpectraCal 1-22.
Sedigh, 1998, Evaluation of filtering mechanisms for MPEG video communications, IEES Symp Rel Dist Sys (6 pages).
Sony, 2017, HDR (High Dynamic Range), Sony Corporation (15 pages).
Stumpfel, 2004, Direct HDR Capture of the Sun and Sky, Computer graphics, virtual reality, visualisation and Interaction in Africa (9 pages).
Tiwari, 2015, A review on high-dynamic range imaging with its technique, Int J Sig Proc, IPPR 8(9):93-100.
Kronander, 2014, Unified HDR reconstrucction from raw CFA data, CCP13 (10 pages).
Okuda, 2007, Effective color space representation for wavelet based compression of HDR images, unsourced (5 pages).
Tourapis, 2015, Deblocking in HEVC: some observations from the HDR/WCG CfE, JCT-VC 21st Meeting.
Wige, 2010, Analysis of in-loop denoising in lossy transform coding, Pict Coding Symp 8-12-2010-10-12-2010.

\* cited by examiner

$$T = \begin{bmatrix} .3536 & .3536 & .3536 & .3536 & .3536 & .3536 & .3536 & .3536 \\ .4904 & .4157 & .2778 & .0975 & -.0975 & -.2778 & -.4157 & -.4904 \\ .4619 & .1913 & -.1913 & -.4619 & -.4619 & -.1913 & .1913 & .4619 \\ .4157 & -.0975 & -.4904 & -.2778 & .2778 & .4904 & .0975 & -.4157 \\ .3536 & -.3536 & -.3536 & .3536 & .3536 & -.3536 & -.3536 & .3536 \\ .2778 & -.4904 & .0975 & .4157 & -.4157 & -.0975 & .4904 & -.2778 \\ .1913 & -.4619 & .4619 & -.1913 & -.1913 & .4619 & -.4619 & .1913 \\ .0975 & -.2778 & .4157 & -.4904 & .4904 & -.4157 & .2778 & -.0975 \end{bmatrix}$$

FIG. 3

$$\text{Original} = \begin{bmatrix} 154 & 123 & 123 & 123 & 123 & 123 & 123 & 136 \\ 192 & 180 & 136 & 154 & 154 & 154 & 136 & 110 \\ 254 & 198 & 154 & 154 & 180 & 154 & 123 & 123 \\ 239 & 180 & 136 & 180 & 180 & 166 & 123 & 123 \\ 180 & 154 & 136 & 167 & 166 & 149 & 136 & 136 \\ 128 & 136 & 123 & 136 & 154 & 180 & 198 & 154 \\ 123 & 105 & 110 & 149 & 136 & 136 & 180 & 166 \\ 110 & 136 & 123 & 123 & 123 & 136 & 154 & 136 \end{bmatrix}$$

$$M = \begin{bmatrix} 26 & -5 & -5 & -5 & -5 & -5 & -5 & 8 \\ 64 & 52 & 8 & 26 & 26 & 26 & 8 & -18 \\ 126 & 70 & 26 & 26 & 52 & 26 & -5 & -5 \\ 111 & 52 & 8 & 52 & 52 & 38 & -5 & -5 \\ 52 & 26 & 8 & 39 & 38 & 21 & 8 & 8 \\ 0 & 8 & -5 & 8 & 26 & 52 & 70 & 26 \\ -5 & -23 & -18 & 21 & 8 & 8 & 52 & 38 \\ -18 & 8 & -5 & -5 & -5 & 8 & 26 & 8 \end{bmatrix}$$

$$D = \begin{bmatrix} 162.3 & 40.6 & 20.0 & 72.3 & 30.3 & 12.5 & -19.7 & -11.5 \\ 30.5 & 108.4 & 10.5 & 32.3 & 27.7 & -15.5 & 18.4 & -2.0 \\ -94.1 & -60.1 & 12.3 & -43.4 & -31.3 & 6.1 & -3.3 & 7.1 \\ -38.6 & -83.4 & -5.4 & -22.2 & -13.5 & 15.5 & -1.3 & 3.5 \\ -31.3 & 17.9 & -5.5 & -12.4 & 14.3 & -6.0 & 11.5 & -6.0 \\ -0.9 & -11.8 & 12.8 & 0.2 & 28.1 & 12.6 & 8.4 & 2.9 \\ 4.6 & -2.4 & 12.2 & 6.6 & -18.7 & -12.8 & 7.7 & 12.0 \\ -10.0 & 11.2 & 7.8 & -16.3 & 21.5 & 0.0 & 5.9 & 10.7 \end{bmatrix}$$

FIG. 4

$$Q50 = \begin{bmatrix} 16 & 11 & 10 & 16 & 24 & 40 & 51 & 61 \\ 12 & 12 & 14 & 19 & 26 & 58 & 60 & 55 \\ 14 & 13 & 16 & 24 & 40 & 57 & 69 & 56 \\ 14 & 17 & 22 & 29 & 51 & 87 & 80 & 62 \\ 18 & 22 & 37 & 56 & 68 & 109 & 103 & 77 \\ 24 & 35 & 55 & 64 & 81 & 104 & 113 & 92 \\ 49 & 64 & 78 & 87 & 103 & 121 & 120 & 101 \\ 72 & 92 & 95 & 98 & 112 & 100 & 103 & 99 \end{bmatrix}$$

$$C = \begin{bmatrix} 10 & 4 & 2 & 5 & 1 & 0 & 0 & 0 \\ 3 & 9 & 1 & 2 & 1 & 0 & 0 & 0 \\ -7 & -5 & 1 & -2 & -1 & 0 & 0 & 0 \\ -3 & -5 & 0 & -1 & 0 & 0 & 0 & 0 \\ -2 & 1 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \end{bmatrix}$$

$$C = \begin{bmatrix} 10 & 4 & 2 & 5 & 1 & 0 & 0 & 0 \\ 3 & 9 & 1 & 2 & 1 & 0 & 0 & 0 \\ -7 & -5 & 1 & -2 & -1 & 0 & 0 & 0 \\ -3 & -5 & 0 & -1 & 0 & 0 & 0 & 0 \\ -2 & 1 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \end{bmatrix}$$

$$R = \begin{bmatrix} 160 & 44 & 20 & 80 & 24 & 0 & 0 & 0 \\ 36 & 108 & 14 & 38 & 26 & 0 & 0 & 0 \\ -98 & -65 & 16 & -48 & -40 & 0 & 0 & 0 \\ -42 & -85 & 0 & -29 & 0 & 0 & 0 & 0 \\ -36 & 22 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \end{bmatrix}$$

IMAGE COMPRESSION

TECHNICAL FIELD

The disclosure relates to image compression.

BACKGROUND

As reliance on computers and the Internet continues to grow, so too does the need for efficient ways of storing and sending large amounts of data. For example, a web page with dozens, if not hundreds, of images needs to use some form of image compression to store images. Likewise, an online catalog packed with images requires image compression to download the images over the Internet quickly.

The Joint Photographic Experts Group (JPEG) has created a popular image compression process that simplifies certain high-frequency components in an image and then compresses the image for storage. Typical JPEG files convert images from the RGB color space to the $YC_bC_r$ space. The Y channel, often referred to as the Luma, is preserved; whereas the $C_bC_r$ channel, often referred to as the Chroma, is down-sampled, or reduced, and then both channels are split into 8×8 blocks. That is, the first "lossy" step of the algorithm and, depending on the size of the image, can result in artifacts being introduced into the image. Next, the discrete cosine transform (DCT) is used to convert the 8×8 Luma and Chroma blocks into DCT coefficients in order to minimize, or eliminate, the higher frequencies, which are not perceived by the human eye as readily as the lower frequencies. The DCT coefficients for Luma and Chroma are then quantized, which, among other things, eliminates the higher coefficients representing the higher frequencies. Next, the quantized coefficients are compressed using Run Length Encoding to group all like coefficients such as "zeros" left over from quantizing. Finally, the Run Length Encoded values are further compressed using Huffman coding which uses shorter code words for more often used run-length encoding (RLE) values and longer code words for less often used RLE values. Because JPEG is a lossy compression algorithm, decompression will present artifacts in the image, such as so called blocking artifacts.

SUMMARY

The invention provides methods for removing image artifacts in JPEG compressed images. The result is an improved JPEG process that produces high-quality decompressed images. In particular aspect, methods of the invention apply a low-pass filter to de-quantized upsampled Chroma data to reduce output image blocking artifacts. The invention also contemplates applying a low-pass filter in other ways as discussed below. In any case, the invention provides the benefits of compression while maintaining image quality at a high level in the decompressed image.

Figure 1:
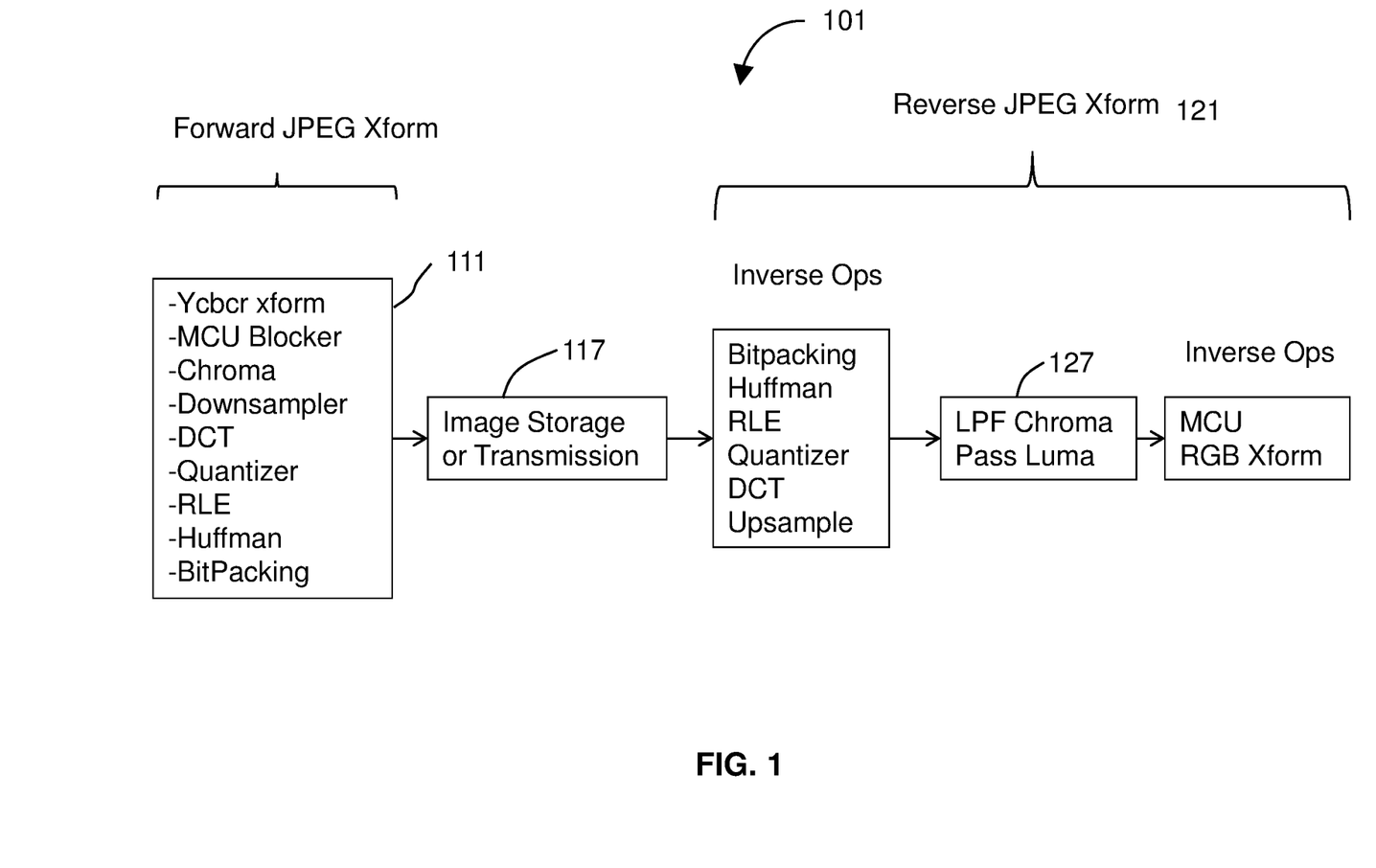
FIG. 1 diagrams a method for JPEG compression.

In certain preferred aspects, the invention provides methods for compressing image data. Methods include executing a JPEG transform, storing and/or transmitting the compressed image, decompressing the image data, applying a low-pass filter to the Chroma channel of the decompressed data and converting the Chroma and Luma portions back to the RGB color space for display. An example of this process is shown in FIG. 1. In brief, as shown in FIG. 1, RGB image data are converted to the YCbCr space, the Chroma channel is downsampled and a discrete cosine transform (DCT) is performed on the Chroma, both channels are quantized, and compression steps, such Huffman coding, bitpacking and the like, are used to produce compressed image data for storage or transmission. A reverse transform is conducted to reconstitute the image in which the Chroma channel is subsequently passed through a low-pass filter and then both channels are transformed back into the RGB space for viewing. While FIG. 1 illustrates a preferred method, the invention contemplates broad use of low pass filters to reduce artifacts resulting from JPEG compression.

In certain embodiments, the various compression steps (e.g., DCT, quantization, entropy encoding (e.g., Huffman encoding, bitpacking, etc.) are performed by a computer system comprising a processor coupled to a non-transitory memory device. Methods may optionally include writing the compressed image data to disc as an image file, such as a JPEG file, or transmitting the compressed image.

In certain aspects, the invention provides methods for compressing image data. Embodiments of the methods include obtaining a JPEG compressed image corresponding to an original image and decompressing the JPEG compressed image to produce an output image via a decompression operation that includes a low pass filter. Preferably, decompressing the JPEG image comprises decoding the image to produce a YCbCr image having Luma and Chroma components. The low pass filter may be applied to the Chroma components of the YCbCr image to produce a filtered YCbCr image. The method may include transforming the filtered YCbCr image into the RGB color space to produce the output image.

In certain embodiments, obtaining the JPEG compressed image includes receiving the original image and performing a discrete cosine transform (DCT) (e.g., such as a type-II DCT) and quantization step on image data from the original image, and may include transforming the original image from the RGB color space into the YCbCr color space and blocking the image into blocks of pixels. In some embodiments, quantizing the DCT coefficients includes scaling the DCT coefficients and rounding the scaled DCT coefficients to the nearest integers. The quantized DCT coefficients may be compressed via entropy encoding (e.g., Huffman coding or run length encoding) to create the JPEG compressed image. Preferably, the steps are performed using a device such as a computer or a camera that includes a processor coupled to a non-transitory, tangible memory. The JPEG compressed image may be written to the tangible memory. Preferably, the low pass filter removes one or more blocking artifacts from the output image.

Aspects of the invention provide a hardware system in which at least one device includes a processor coupled to a non-transitory memory device. The memory device stores instructions executable by the processor to cause the system to obtain a JPEG compressed image corresponding to an original image and decompress the JPEG compressed image to produce an output image via a decompression operation that includes a low pass filter.

Methods disclosed herein can be carried out by any suitable device, such as a digital camera, a computer, a tablet computer, a wearable computer, a mobile phone, or a smartphone. In such examples, the method is written as a set of instructions that when executed by a device processor, causes the device to perform the method. These instructions can be stored in a non-transitory computer readable medium, such RAM or disk memory.

Methods of the invention may be implemented within a camera so that the camera can capture, store, or transmit pictures or videos with improved quality or compression. Thus in some embodiments, methods of the invention include receiving, from an image sensor, image data onto a processing device on a camera. The processing device may be a chip such as a field-programmable gate array or application-specific integrated circuit. The processing device transforms the image data into the frequency domain and quantizes and low-pass filters the resultant frequency components.

In some aspects, the disclosure provides a method for compressing image data. The method includes: performing a discrete cosine transform (DCT) on image data to return DCT coefficients; quantizing and applying a low-pass filter (LPF) to the DCT coefficients to return quantized, filtered DCT coefficients; and compressing the quantized, filtered DCT coefficients to produce the compressed image data. Prior art compressed formats such as JPEG do not have an LP applied to DCT coefficients independently of a quantization step. The low-pass filter may be applied prior to the quantizing or the quantizing may be performed prior to the low-pass filter. Preferably the low-pass filter discards non-zero values for one or more of the DCT coefficients that represent a high-frequency component of the image data. The low pass filter may be used to remove one or more blocking artifacts from the output image. The steps may be performed by a computer system comprising a processor coupled to a non-transitory memory device. In some embodiments, compressing the quantized, filtered DCT coefficients comprises Huffman coding and writing the compressed image data to the non-transitory memory device as a JPEG file. The method may include transforming the original image from the RGB color space into the YCbCr color space.

In certain embodiments, quantizing the DCT coefficients includes scaling the DCT coefficients and rounding the scaled DCT coefficients to the nearest integers. Compressing the quantized, filtered DCT coefficients to produce the compressed image data may be done by entropy encoding to create a JPEG compressed image. The entropy coding may include Huffman coding or run length encoding. The steps may be performed by a computer system comprising a processor coupled to a non-transitory memory device and the method may include writing the JPEG compressed image to the memory device.

BRIEF DESCRIPTION OF THE DRAWINGS

FIG. 4 shows obtaining a matrix of DCT coefficients.

DETAILED DESCRIPTION

The invention provides methods that improve the JPEG process by using a low-pass filter to remove high frequency components from image data, preferably by applying a low-pass filter to the Chroma components after decompressing a JPEG file. Generally, in methods of the invention, an RGB file is converted into YCbCr color space. The Y, Cr, and Cb channels are blocked by minimum code unit (MCU). The MCUs are subject to a discrete cosine transform (DCT) and quantization. The resultant matrices are encoded in a compressed manner by, e.g., Huffman encoding. The compressed data may be written to a file and/or transmitted, e.g., over the Internet. The compression may be performed by a general purpose computer or may be implemented in a device such as a camera that uses an image sensor to capture images and may further include a processing device to operate as an image compressor.

FIG. 1 diagrams a method 101 for JPEG compression/decompression according to embodiments of the invention. The left portion shows compression via the forward JPEG transform block 111, and the diagram continues to the right to show the reverse JPEG transform 121, i.e., the decompression. JPEG was designed by the Joint Photographic Experts Group to compress realistic true-color or grayscale images, such as photographs or fine artwork. JPEG supports 256 color grades (8 bit) per color channel. This equals 24 bits per pixel in color mode (16 million colors) and 8 bits per pixel in grayscale. Grayscale images are thus smaller than their full-color counterparts. JPEG can compress the average color image about 20 times without visual quality loss.

JPEGs compress images based on their spatial frequency, or level of detail in the image. In the forward JPEG transform block 111, the JPEG algorithm transforms the image from an RGB color space into the luminance/chrominance (YCbCr) color space. In preferred embodiments, the algorithm leaves luminance alone and "downsamples" the Chroma components 2:1 horizontally (either by discarding every second horizontal sample or averaging the two hue values into one) and 2:1 or 1:1 vertically, saving about one-half to one-third off the image data. This is often abbreviated as 4:2:2 or 4:1:1 sampling.

Additionally, the pixel values for each component are grouped into 8×8 blocks, or MCUs. These blocks then are transformed from the spatial domain to the frequency domain with a Discrete Cosine Transform (DCT), performed separately for the Luma and both Chroma components. The DCT converts the image into a two-dimensional array of frequency coefficients, which are then quantized. In quantization, each block of 64 frequency components is divided by a separate quantization coefficient and rounded to integer values. For encoding (e.g., run-length encoding, Huffman encoding, Bitpacking) each block is scanned in a zig-zag pattern starting from the top-left corner. This outputs a linear stream of bits which allows for lossless compression of non-zero coefficients with arithmetic or Huffman coding. The product of this portion of the pipeline is highly compressed and suitable for storage or transmission 117.

The remaining steps of the method 101 show the decompression of JPEG, i.e., the reverse JPEG transform 121. The reverse transform 121 includes undoing the encoding (e.g., reversing the Huffman/RLE) and then multiplying by the quantization matrix to re-constitute the DCT coefficients. Those are transformed back into the spatial domain by the inverse DCT (IDCT) equation. The blocks are up-sampled and subject to filtering 127 before reversing the MCU blocker and transforming from YCbCr into RGB color space.

In some preferred embodiments, the invention includes the filtering 127 within the method 101 of JPEG compression/decompression. In the filtering 127 step, the Luma components may be passed through the pipeline without applying any filters, while the Chroma components are subject to a low-pass filter (LPF).

The LPF improves the image quality by removing blocking artifacts that have been introduced via other steps of the method 101. Blocking artifacts are visible elements not appearing the original image but that are present after the JPEG method 101. Blocking artifacts are present predominantly in the higher frequencies, and thus are removed by the LPF. Thus the LPF 127 is applied to the Chroma components, the high-frequency blocking artifacts are removed, and the final output JPEG has an improved appearance—lacking blocking artifacts—relative to a JPEG produced by a method that is similar but lacking an LPF.

Figure 2:
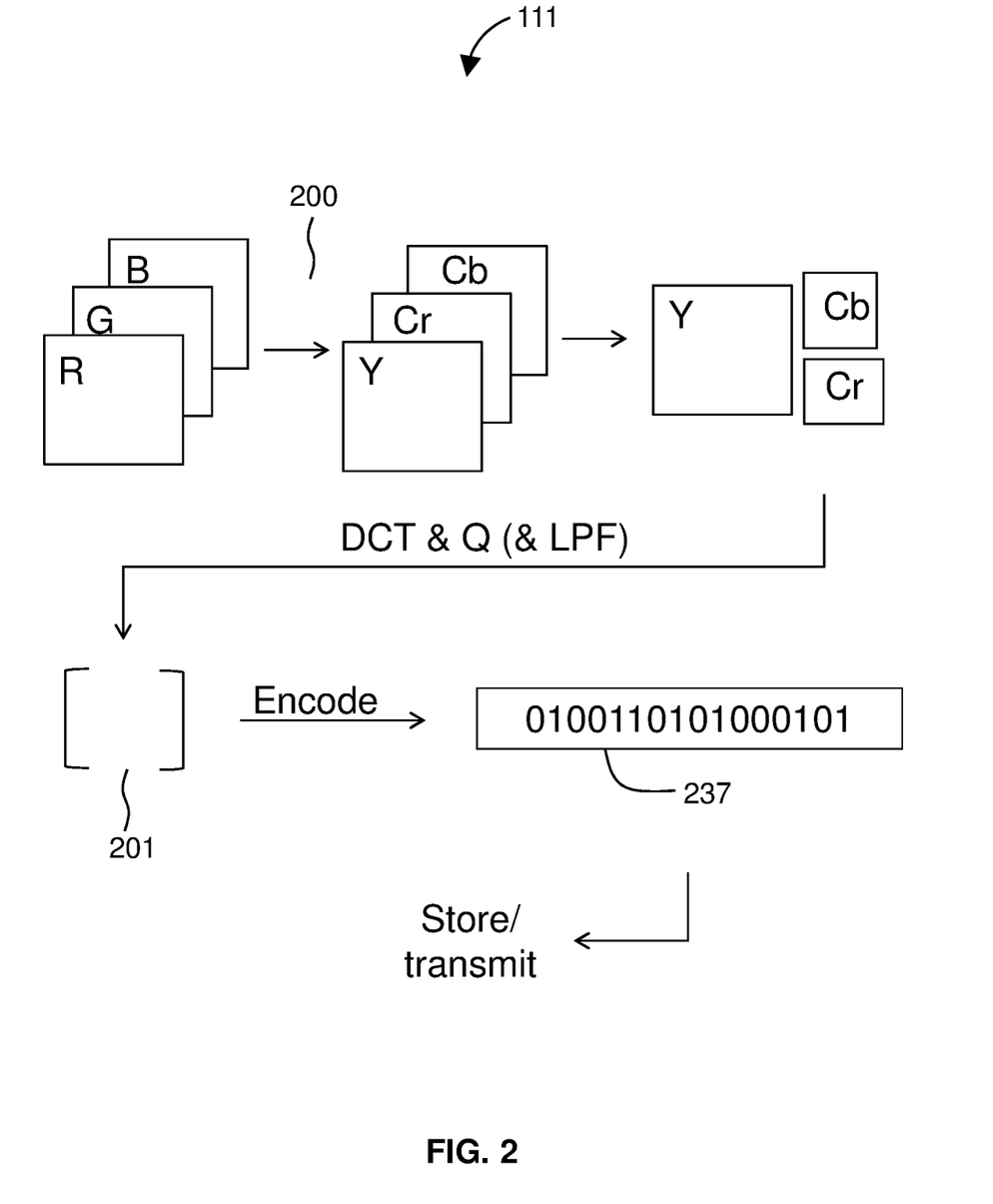
FIG. 2 is a detailed diagram of JPEG encoding.

FIG. 2 shows the JPEG encoding 111 in greater detail. The RGB input is transformed into the YCbCr color space. In preferred embodiments, the algorithm leaves luminance alone and downsamples the Chroma components. The image is broken into blocks of, for example, 8×8 pixels and each block is transformed using the DCT. The resulting 64 DCT coefficients are quantized (Q) to a finite set of values. The degree of rounding depends upon the specific coefficients. The DC coefficient (at location 0,0) is a measure of the average value of the 64 pixels within the specific image block and the remaining 63 quantized coefficients are scanned in zig zag sequence. In some aspects, the disclosure provides a method 111 for compressing image data. The method includes: performing a discrete cosine transform (DCT) on image data to return DCT coefficients; quantizing (Q) and applying a low-pass filter (LPF) to the DCT coefficients to return quantized, filtered DCT coefficients 201; and compressing the quantized, filtered DCT coefficients 201 to produce the compressed image data (e.g., stream of bits 237). The return quantized, filtered DCT coefficients 201 provide an unexpected benefit in that the LPF removes blocking artifacts from a final compressed image that is stored or transmitted by the method 111. The low-pass filter (LPF) may be applied prior to the quantizing or the quantizing may be performed prior to the low-pass filter.

Preferably the low-pass filter discards non-zero values for one or more of the DCT coefficients that represent a high-frequency component of the image data. The steps may be performed by a computer system comprising a processor coupled to a non-transitory memory device. In some embodiments, compressing the quantized, filtered DCT coefficients 201 comprises Huffman coding and writing the compressed image data (e.g., the stream of bits 237) to the non-transitory memory device as a JPEG file. The method may include transforming 200 the original image from the RGB color space into the YCbCr color space.

The DCT may use a DCT equation given by Equation 1 below. The DCT equation computes the i,jth entry of the DCT of the image data 15. Thus p(x, y) is the x,yth element of the image represented by the matrix p. The DCT equation calculates one entry (i,jth) of a transformed image from pixel values of an original image matrix.

$$D(i, j) = \frac{1}{\sqrt{2N}} C(i)C(j) \sum_{x=0}^{N-1}\sum_{y=0}^{N-1} p(x, y)\cos\left[\frac{(2x+1)i\pi}{2N}\right]\cos\left[\frac{(2y+1)j\pi}{2N}\right] \quad 1$$

$$C(u) = \begin{cases} \frac{1}{\sqrt{2}} & \text{if } u = 0 \\ 1 & \text{if } u > 0 \end{cases} \quad 2$$

By way of non-limiting example, the image data can include an image block of 8×8 pixels so that N equals 8, and x and y range from 0 to 7. (Other image block sizes are contemplated such as 4×4 pixels and 16×16 pixels) The DCT equation for an 8×8 image block is given Equation 3 below.

$$D(i, j) = \frac{1}{4} C(i)C(j) \sum_{x=0}^{7}\sum_{y=0}^{7} p(x, y)\cos\left[\frac{(2x+1)i\pi}{16}\right]\cos\left[\frac{(2y+1)j\pi}{16}\right] \quad 3$$

To put Equation 1 into matrix form, use Equation 4.

$$T_{i,j} = \begin{cases} \frac{1}{\sqrt{N}} & \text{if } i = 0 \\ \sqrt{\frac{2}{N}}\cos\left[\frac{(2j+1)i\pi}{2N}\right] & \text{if } i > 0 \end{cases} \quad 4$$

Figure 3:
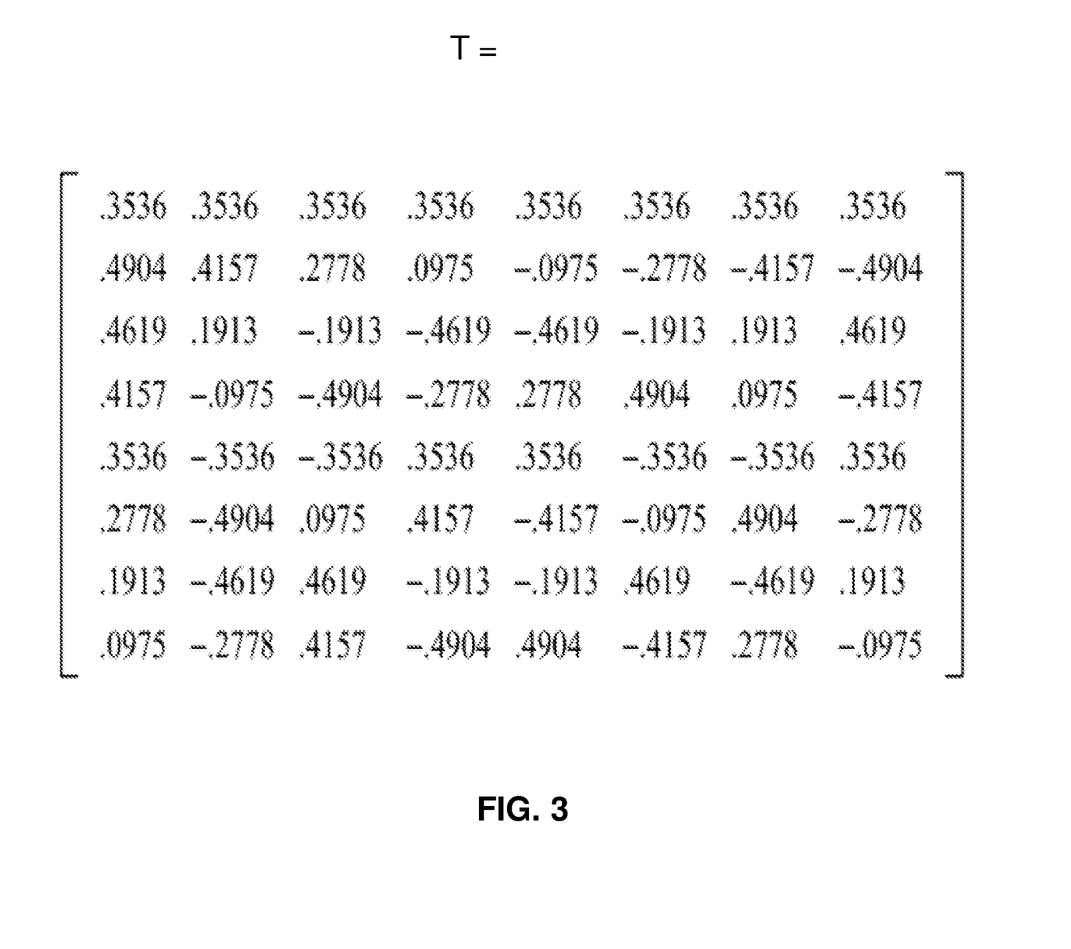
FIG. 3 shows the matrix for a DCT.

FIG. 3 shows the matrix T provided by Equation 4. The top row (i=1) of T has all entries equal to 1/(SQRT(8)).

FIG. 4 shows obtaining a matrix of 64 DCT coefficients from an input 8×8 block of pixels. At the top is depicted a block of image-pixel values ("Original"). The block is made to have the values (which range from 0 to 256) be "centered" on zero by subtracting 128 from each entry, to create the matrix M shown in the middle. The DCT is performed on the matrix M according to matrix multiplication via D=TMT−1. This yields the matrix D at the bottom.

Matrix D include 64 DCT coefficients in which the top-left entry corresponds to the low frequencies of the original image block. The matrix D will next be quantized through the use of a quantization matrix Q. One may choose a level of compression or quality through the choice of which matrix Q is used. A middle-ground example is shown wherein the matrix is Q50.

Figure 5:
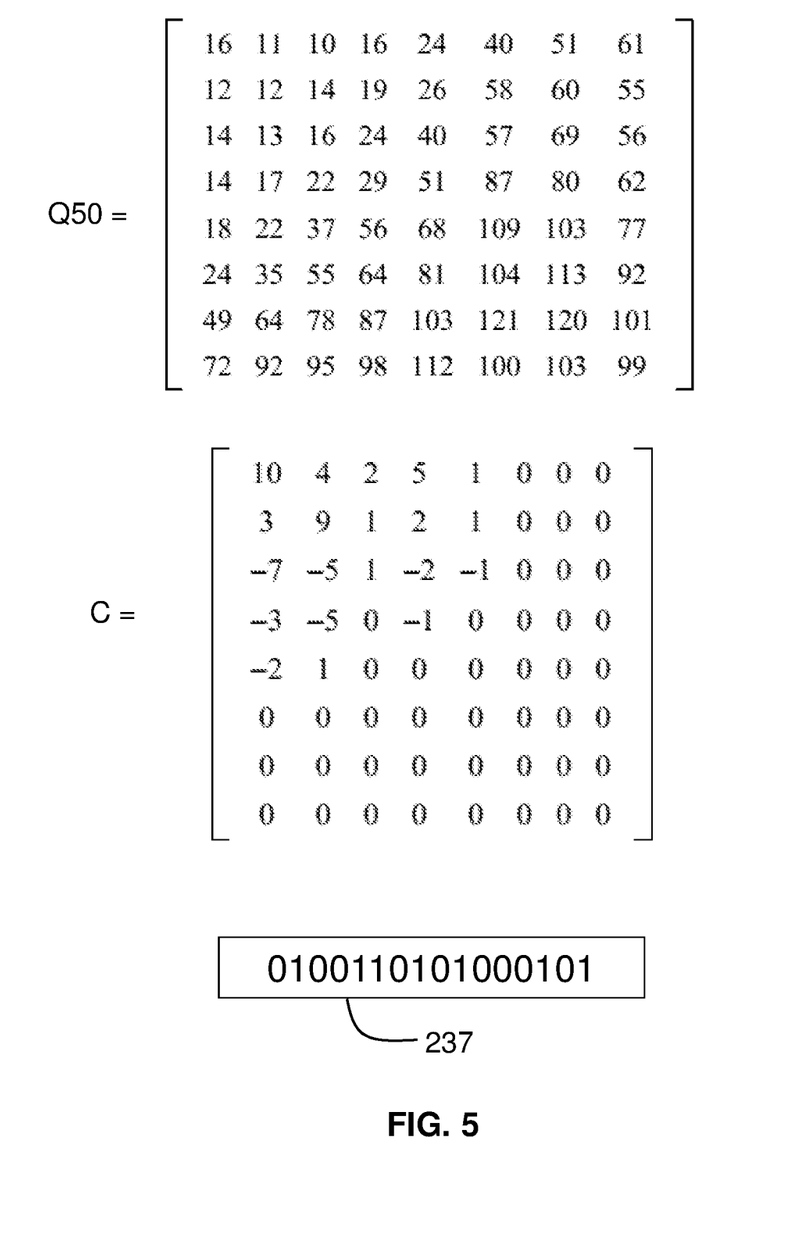
FIG. 5 shows a quantization matrix.

FIG. 5 shows Q50, a standard quantization matrix with a quality level of 50.

For quantization, each element in the matrix D is divided by the corresponding element in the quantization matrix Q (here, Q50). This yields the matrix C of quantized coefficients. Thus, here, the method 111, quantizing the DCT coefficients includes scaling the DCT coefficients and rounding the scaled DCT coefficients to the nearest integers.

The quantized matrix C is then encoded. Encoding includes converting the coefficients of C into binary and reading entries from the matrix C in a zig-zag order, starting with entry (0,0), and proceeding through (0,1), (1,0), (1,1), (0,2). This results in a linear stream 237 of bits which is encoded in a compressed fashion by, e.g., Huffman encoding.

The resulting encoded, compressed stream of bits 237 can then be stored or transmitted 117. Due to the encoding and compression, the file will be smaller and thus take up less disc space than the original file. Here, compressing the quantized, filtered DCT coefficients 201 to produce the compressed image data may be done by entropy encoding to create a JPEG compressed image. The entropy coding may include Huffman coding or run length encoding. After storing or transmitting 117 the file(s), the image can be subject to the reverse JPEG transform 121 of method 101 for decompression and presentation of a high-quality image.

Decompression refers to the process of reconstruction the image from the compressed, encoded bits.

Figure 6:
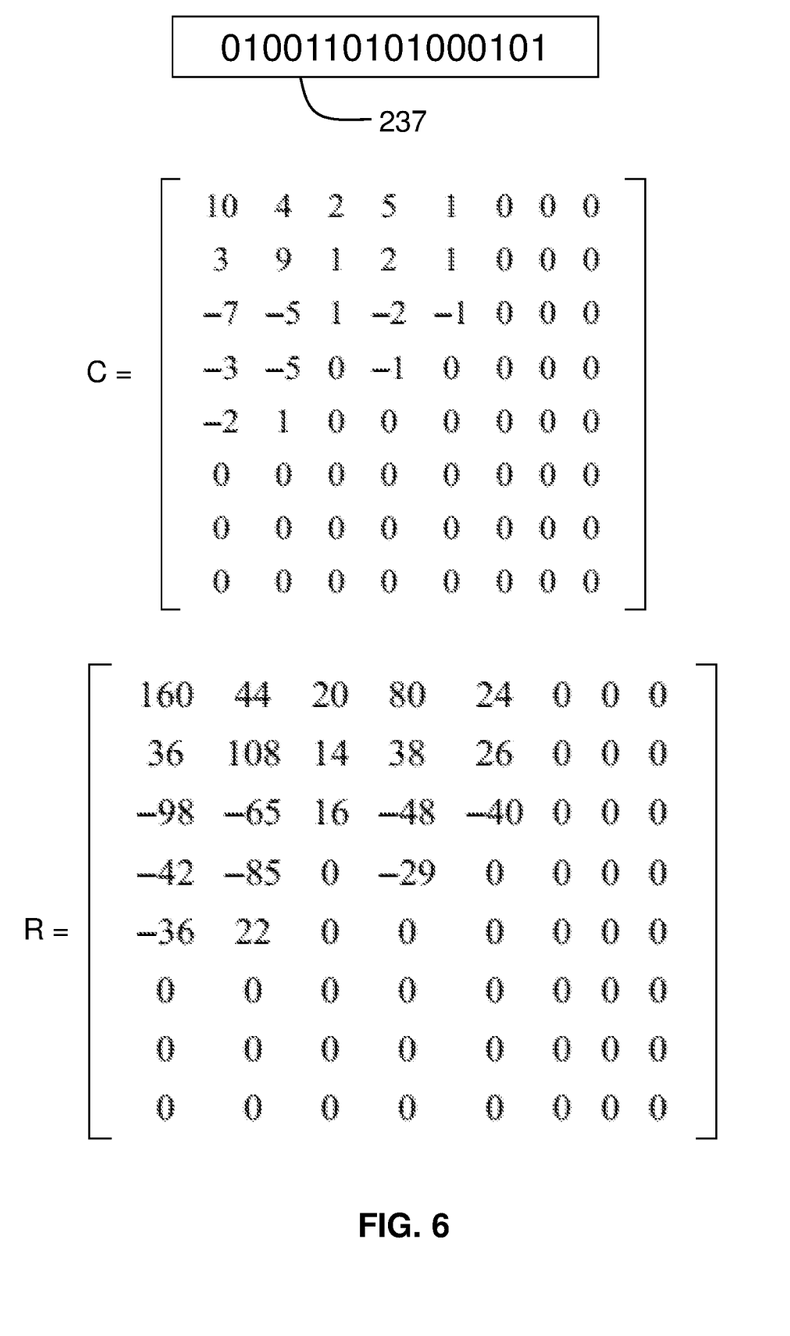
FIG. 6 illustrates decompression of the image.

FIG. 6 illustrates steps of the decompression of the image. The bit stream is initially decoded back into the quantized matrix C. Each element of C is multiplied by the corresponding element of the quantization matrix Q that was used, to result in the matrix R.

The matrix R is subject to an inverse DCT (IDCT), and 128 is added to each entry, which produces an decompressed JPEG version of the original corresponding MCU.

Decompression is accomplished by applying the inverse of each of the preceding steps in opposite order. Thus, the decoding process starts with entropy decoding and proceeds to convert the run lengths to a sequence of zeros and coefficients. Coefficients are de-quantized and subject to the Inverse Discrete Cosine Transform (IDCT). The resulting upsampled image in the YCbCr color space may then be filtered according to methods of the invention.

Figure 7:
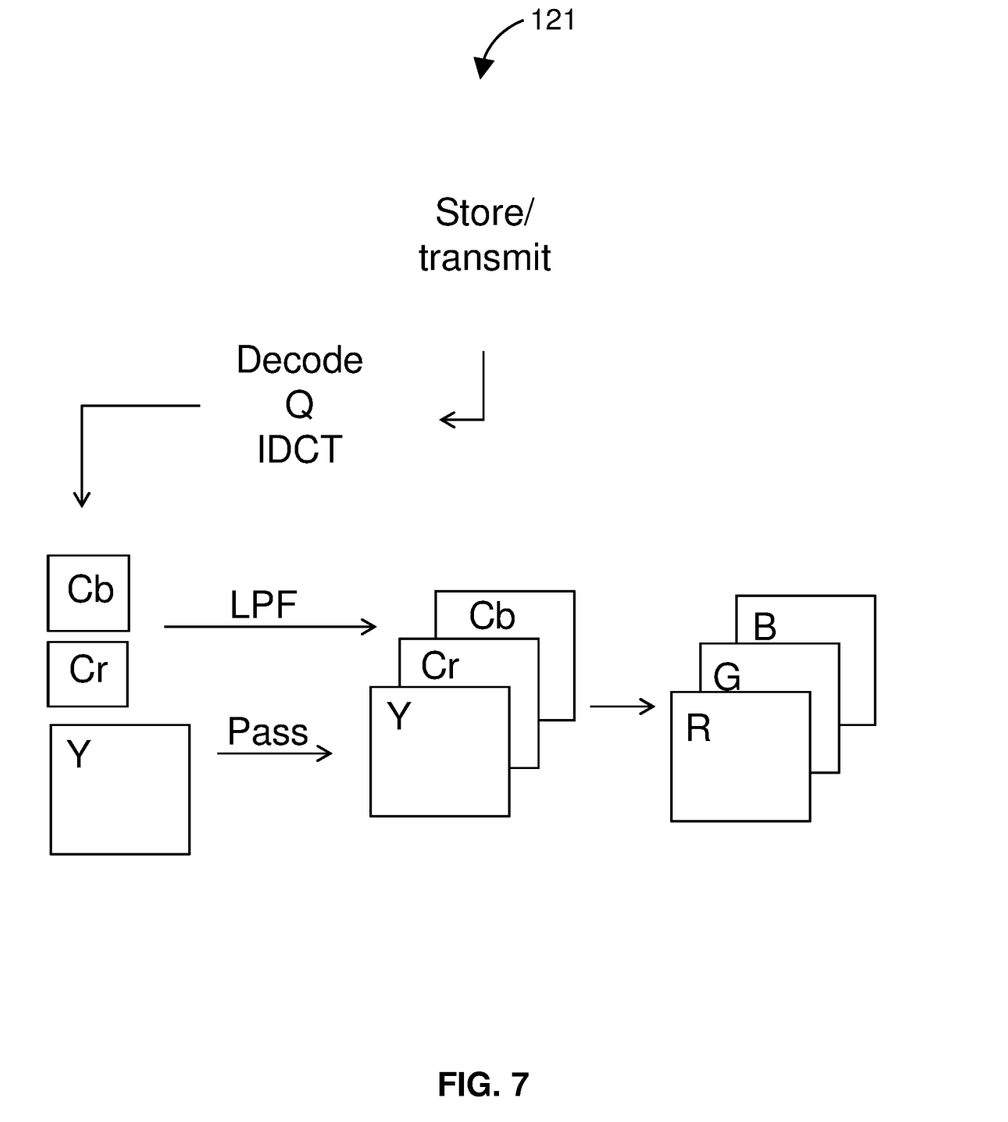
FIG. 7 shows a decompression operation that includes a low pass filter.

FIG. 7 shows steps of the reverse JPEG transform 121 according to the method 101. It can be seen that after the initial inverse operations (e.g., de-quantization and IDCT), the image is in the YCbCr color space. Preferably, the method 101 operates on upsampled MCUs in the YCbCr color space. At this stage, the Chroma components of the image are subject to a low-pass filter. The low pass filter (LPF) removes high-frequency components from the image data.

By including an LPF, blocking artifacts are removed. An LPF is a type of filter that removes signals above a certain frequency or removes high-frequency signal from the image. Implementation of an LPF is understood in the art and is applied herein the reverse JPEG transform 121 to improve image quality by, e.g., removing blocking artifacts.

Blocking artifacts include distortion in compressed images that may appear as a pattern of visible block boundaries. Those artifacts result from the coarse quantization of the coefficients and the independent processing of the blocks. Implementing an LPF may remove the blocking artifacts. The LPF may be implemented as a kernel (e.g., with positive values) that operates on the Chroma components during decompression 121. Thus the invention provides a method 101 for JPEG compression/decompression that includes an LPF to remove blocking artifacts.

Preferably the LPF operates on the Chroma components during decompression 121. Optionally, it may be found that the LPF is useful or beneficial at other step(s) of the forward JPEG compression block 111 or the reverse transform 121. Thus it is within the scope of the invention to include one or more LPF at any step of the diagramed methods.

FIG. 7 thus shows steps of a method that includes obtaining a JPEG compressed image corresponding to an original image and decompressing the JPEG compressed image to produce an output image (e.g., substantially similar to the original image) via a decompression operation that includes a low pass filter. Decompressing the JPEG image may include decoding the image to produce a YCbCr image having Luma and Chroma components. Preferably, the low pass filter is applied to the Chroma components of the YCbCr image to produce a filtered YCbCr image. The method may include transforming the filtered YCbCr image into the RGB color space to produce the output image.

Obtaining the JPEG compressed image may proceed as shown in FIG. 2, e.g., by receiving the original image and performing a discrete cosine transform (DCT) and quantization step on image data from the original image. The method may include transforming the original image from the RGB color space into the YCbCr color space and blocking the image into blocks of pixels.

Methods of the invention may be implemented in hardware or using software as embodied within a device or systems of the invention.

Figure 8:
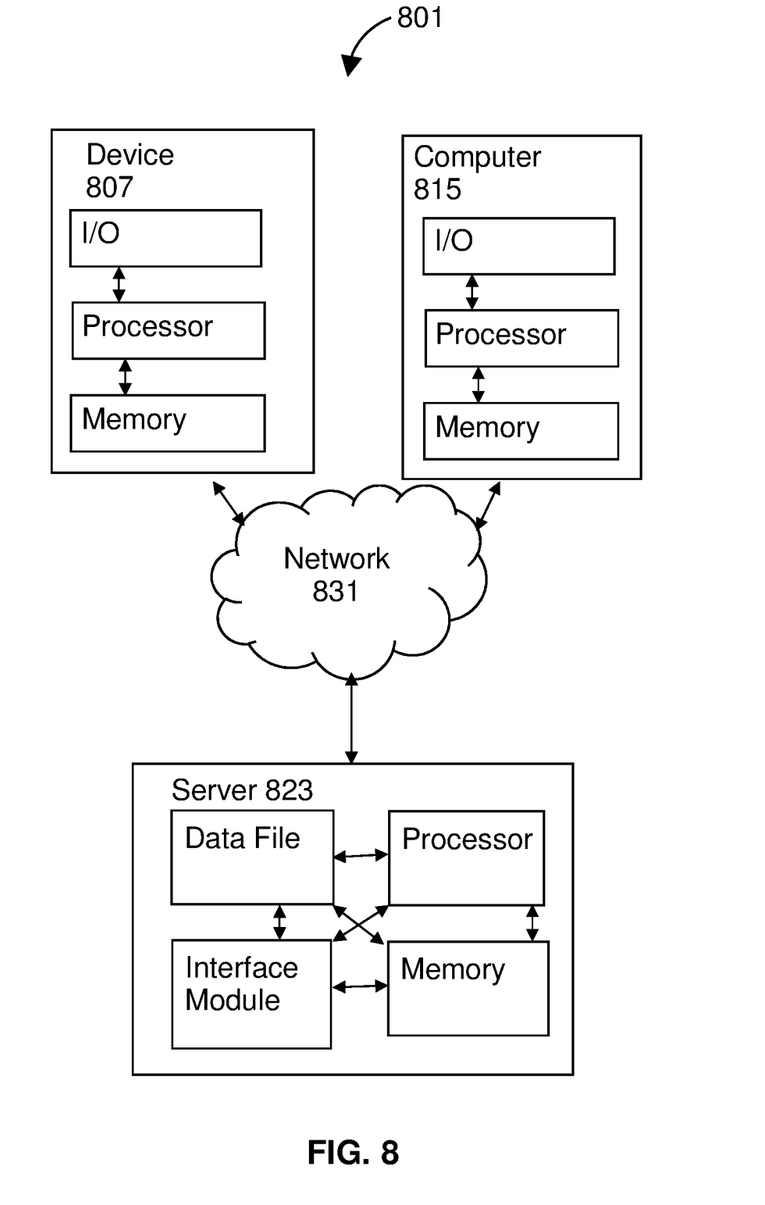
FIG. 8 shows a system for JPEG compression or decompression.

FIG. 8 shows a system 801 useful for image compression by methods of the invention. The system 801 preferably includes at least one computer 815. Optionally, the system 801 includes a device 807 (such as a digital still or movie camera), a server computer 823, or both. Each of the computer 815, device 807, and server 823—when included in the system 801—preferably includes at least one processor coupled to memory and one or more input/output devices. The computer 815, device 807, and server 823, when present, are able to communicate over network 831.

The system 801 thus includes a processor coupled to a non-transitory memory device. The memory preferably stores instructions executable by the processor to cause the system to obtain a JPEG compressed image corresponding to an original image and decompress the JPEG compressed image to produce an output image via a decompression operation that includes a low pass filter.

Processor refers to any device or system of devices that performs processing operations. A processor will generally include a chip, such as a single core or multi-core chip, to provide a central processing unit (CPU). A process may be provided by a chip from Intel or AMD. A processor may be any suitable processor such as the microprocessor sold under the trademark XEON E7 by Intel (Santa Clara, CA) or the microprocessor sold under the trademark OPTERON 6200 by AMD (Sunnyvale, CA).

Memory refers a device or system of devices that store data or instructions in a machine-readable format. Memory may include one or more sets of instructions (e.g., software) which, when executed by one or more of the processors of the disclosed computers can accomplish some or all of the methods or functions described herein. Preferably, each computer includes a non-transitory memory such as a solid state drive, flash drive, disk drive, hard drive, subscriber identity module (SIM) card, secure digital card (SD card), micro SD card, or solid-state drive (SSD), optical and magnetic media, others, or a combination thereof.

An input/output device is a mechanism or system for transferring data into or out of a computer. Exemplary input/output devices include a video display unit (e.g., a liquid crystal display (LCD) or a cathode ray tube (CRT)), an alphanumeric input device (e.g., a keyboard), a cursor control device (e.g., a mouse), a disk drive unit, a signal generation device (e.g., a speaker), a touchscreen, an accelerometer, a microphone, a cellular radio frequency antenna, and a network interface device, which can be, for example, a network interface card (NIC), Wi-Fi card, or cellular modem.

Various aspects and functions of the method 101 for JPEG compression/decompression can be implemented using components of the system 801. Those components may include, among others, network appliances, personal computers, workstations, mainframes, networked clients, servers, media servers, application servers, database servers, and web servers. Other examples of computer systems may include mobile computing devices, such as cellular phones and personal digital assistants, and network equipment, such as load balancers, routers, and switches. Further, aspects may be located on a single computer system or may be distributed among a plurality of computer systems connected to one or more communications networks.

INCORPORATION BY REFERENCE

References and citations to other documents, such as patents, patent applications, patent publications, journals, books, papers, web contents, have been made throughout this disclosure. All such documents are hereby incorporated herein by reference in their entirety for all purposes.

EQUIVALENTS

Various modifications of the invention and many further embodiments thereof, in addition to those shown and described herein, will become apparent to those skilled in the art from the full contents of this document, including references to the scientific and patent literature cited herein.

The subject matter herein contains important information, exemplification and guidance that can be adapted to the practice of this invention in its various embodiments and equivalents thereof.

What is claimed is:

1. A method for compressing image data, the method comprising:
   receiving, from an image sensor of a camera, image data into a processor of the camera;
   transforming the image data into Luma data and Chroma data in a YCbCr color space;
   performing a discrete cosine transform (DCT) on the Luma data and the Chroma data to return Luma coefficients and Chroma coefficients;
   quantizing the Luma coefficients and the Chroma coefficients and applying a low-pass filter to the Chroma coefficients, but not to the Luma coefficients, to return quantized, filtered coefficients; and
   compressing the quantized, filtered coefficients to produce compressed image data within the camera.

2. The method of claim 1, wherein the low-pass filter is applied prior to the quantizing.

3. The method of claim 2, further comprising decompressing the compressed image data on the camera to yield an RGB image and displaying the RGB image on a video display unit on the camera.

4. The method of claim 1, wherein the low-pass filter discards non-zero values for one or more of the DCT coefficients that represent a high-frequency component of the image data.

5. The method of claim 1, wherein the steps are performed by the processor, wherein the processor is coupled to a non-transitory memory device within the camera.

6. The method of claim 5, wherein compressing the quantized, filtered DCT coefficients comprises Huffman coding and writing the compressed image data to the non-transitory memory device as a JPEG file.

7. The method of claim 1, wherein the received image data are in the RGB color space.

8. The method of claim 1, wherein the low pass filter removes one or more blocking artifacts from the compressed image data.

9. The method of claim 1, wherein the quantizing includes scaling the Luma coefficients and the Chroma coefficients to scaled DCT coefficients and rounding the scaled DCT coefficients to the nearest integers.

10. The method of claim 1, wherein compressing the quantized, filtered coefficients to produce the compressed image data comprises entropy encoding to create a JPEG compressed image.

11. The method of claim 10, wherein the entropy coding includes Huffman coding or run length encoding.

12. The method of claim 10, wherein the processor is coupled to a non-transitory memory device and the method includes writing the JPEG compressed image to the memory device.

* * * * *